Figure 1:
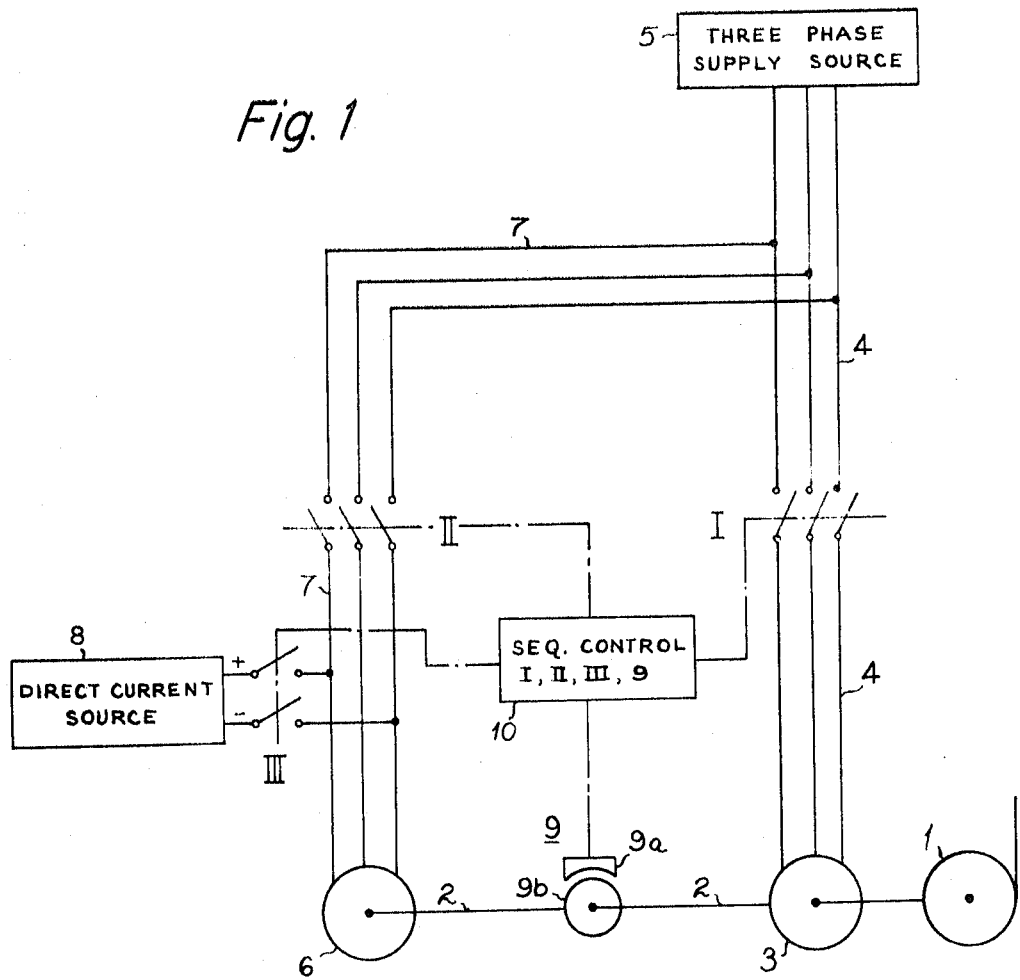

United States Patent

Spiess, deceased et al.

[15] 3,665,272
[45] May 23, 1972

[54] ARRANGEMENT FOR BRAKING A THREE-PHASE MOTOR DRIVEN HOIST

[72] Inventors: Gustav Spiess, deceased, late of Zug, Switzerland; Lina Spiess-Guttinger, Zug; Peter Spiess, Zug; Marianne Spiess, Zug; Hansjorg Spiess, Zug; Walter Spiess, Oberrohrdorf, all of Switzerland heirs

[73] Assignee: Aktiengesellschaft Brown, Boveri & Cie., Baden, Switzerland

[22] Filed: Nov. 6, 1970

[21] Appl. No.: 87,441

[30] Foreign Application Priority Data

Nov. 7, 1969 Switzerland ..........................16577/69

[52] U.S. Cl...............................318/204, 318/209, 318/382
[51] Int. Cl. ........................................................H02p 3/18
[58] Field of Search .................................318/209–212, 382, 318/46, 204

[56] References Cited

UNITED STATES PATENTS 2,531,044  11/1950  Hibbert et al...........................318/46
3,029,372  4/1962  Vogt...................................318/382 X
2,151,734  3/1939  Bouton et al.........................318/382 X
2,354,950  8/1944  Feldhausen.............................318/46
2,704,344  3/1955  Winther et al. .....................318/382 X
2,735,055  2/1956  Thomas...................................318/46

*Primary Examiner*—Gene Z. Rubinson
*Attorney*—Pierce, Scheffler & Parker

[57] ABSTRACT

A braking system for a hoist driven by a polyphase drive motor includes a polyphase eddy current braking machine coupled to the hoist and which has a larger number of poles than the drive motor and a solid rotor. To initiate a braking function after the drive motor has been disconnected from its polyphase power supply source, the stator of the eddy current braking machine is first connected to the polyphase power supply which dynamically reduces the normal hoist speed to a lower value determined by the pole ratio between the drive motor and braking machine. Thereafter, the stator of the braking machine is disconnected from the polyphase power supply source and connected to a direct current power supply source which dynamically effects a further reduction in speed of the hoist to a near stand still level, after which the hoist is then brought to a complete stop by means of a further braking device such as a mechanical brake.

1 Claims, 2 Drawing Figures

Patented May 23, 1972 3,665,272

INVENTOR.
Gustav Spiess
BY
Pierce, Scheffler & Parker
Attorneys

ARRANGEMENT FOR BRAKING A THREE-PHASE MOTOR DRIVEN HOIST

This invention relates to an improved arrangement for braking a hoist which is driven by a polyphase motor.

The braking of a hoist driven by a polyphase motor after the motor has been switched off, by means of a co-rotating electrical braking machine of the eddy-current type, is already known. In order to obtain a load characteristic for the braking machine favorable for braking, the use of a double groove short-circuit armature is also known.

For hoists, it is desirable, after braking to a lower speed, to permit the hoist to continue to run over a short distance at a lower speed. For this, it is also known how to use a coupled high-pole short-circuit armature motor which is connected into the power supply after braking has taken place, i.e. on reaching the low speed.

The present invention also relates to an arrangement for braking a hoist driven by a polyphase motor after the motor has been cut off from its power supply, and wherein the braking is effected by means of a co-rotating eddy-current brake. In accordance with the braking sequence, electrical braking is employed to brake the hoist to nearly a standstill condition after which the hoist is brought to a complete stop by means of a mechanical braking device applied to the drive shaft for the hoist. More particularly, the eddy-current brake is constituted by a polyphase machine having a relatively large number of poles formed on the stator and a rotor which is essentially a solid structure and which is mounted on the same shafting with the rotor of the drive motor of the hoist. In order to initiate the brake sequence after the drive motor for the hoist has been disconnected from its power source, the stator of the eddy-current brake is connected to the polyphase source which furnishes power for the hoist operating motor thereby serving to reduce the speed of the hoist to a lower r.p.m. When this lower speed has been reached, the stator of the eddy-current brake is disconnected from that polyphase source and connected to a source of direct current which further slows the hoist speed to a near standstill. Thereafter a mechanical brake is applied which brings the hoist to a complete stop and holds it until it is desired to re-start the same.

Figure 2:
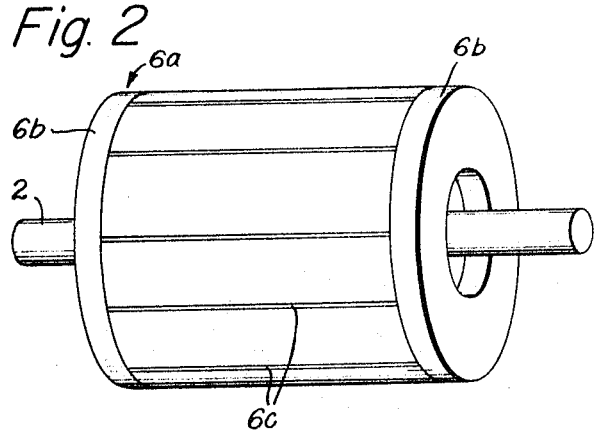

The details of the improved braking arrangement will become more apparent from the following description of one suitable embodiment and which is illustrated in the accompanying drawings, FIG. 1 of which is an electrical schematic showing the hoist and the various electrical components associated therewith and the manner in which they are connected and FIG. 2 is a perspective view of the specially structured rotor of the eddy-current brake.

With reference now to the drawing, the hoist 1 to be driven is connected by shafting 2 to the rotor of a three-phase motor 3. The stator of this motor, which has a relatively low number of poles, advantageously four, is connected via a three-phase line 4 and switch I to a three-phase power supply source 5. The eddy current brake is an electrical machine 6 having a stator winding, with a relatively large number of poles preferably at least three times greater than the number of poles on the stator of the drive motor 1, thus for example 12 poles assuming the drive motor to be a four-pole machine, and a solid rotor connected to the shafting 2.

For the braking of hoists, in accordance with the invention, it is advantageous to use a solid rotor 6a provided with copper ring discs 6b which are soldered on at opposite ends of the rotor and to provide the rotor with radial longitudinal slits 6 c. With a rotor of such design, as illustrated in FIG. 2 the directions in which the eddy currents flow in the solid rotor are particularly favorable for the braking operation. Because of their very low ohmic resistance, the soldered-on copper ring discs 6b bring it about that the axially extending effective rotor currents flow almost completely onto the fronts of the rotor. The annular form further favors flowing of the rotor currents directly below the rotor surface.

The stator of the braking machine 6 which is conventional three-phase design and therefore not illustrated is connectable via a three-phase line 7 and switch II to the connecting line 4 directly into the three-phase power supply source 5. A direct current source 8 is also provided and this is connectable by switch III to line 7 between the stator of the eddy-current brake machine 6 and switch II. This enables the stator of the machine 6 to be selectively connected through switch II to the power supply 5, or through switch III to the direct current power source 8. The braking system also includes a mechanical brake 9 which, as schematically illustrated, includes a brake shoe 9a adapted to engage a brake drum 9b mounted on the drive shafting 2. The three switches I, II and II are coupled together in any suitable manner by way of a control 10 to effect operation in the following sequence:

When it is desired to apply a braking force to the hoist 1, switch I is first opened thus to disconnect the stator of the drive motor 3 from its power supply source 5, followed immediately by closing of switch II which thus serves to connect the stator of the eddy-current braking machine 6 to the power source 5. This results in a braking action on the shafting 2 applied by the rotor of machine 6 as the latter slows the shafting to a speed determined by the number of poles on its stator. The kinetic energy transferred from the hoist via shafting 2 to the rotor of the eddy-current machine is in part transferred to the power source 5 via the connection line 7 and the now closed switch II, and in part is transformed into heat. After this first lower speed level is reached, switch II is opened and switch III is closed. Thereupon, the stator of the brake machine 6 is disconnected from the power source 5 and is instead connected to the direct current power source 8. This brings about a further braking force on the shafting 2 to slow it and the hoist to a near stand still whereupon the mechanical brake 9 is then applied to bring the hoist to a complete stop and switch III is opened.

The braking, after disconnection of switch I and connection of switch II, is effected advantageously to at least one third of the normal hoist speed, corresponding to the assumed pole number ratio of 1 : 3 wherein the polyphase drive motor 3 is a four-pole machine and the eddy-current brake machine has 12 poles. For larger hoist installations, a greater ratio is advantageously used, e.g., the eddy-current brake machine can have, for example, 16, 20 or 24 poles.

The braking arrangement in accordance with the invention enables the brake force to be applied in essentially a jerk-free manner. Moreover, it is possible to execute inspection runs of the hoist system. For this purpose switch II rather than switch I is connected to the power supply source 5 whereupon the hoist 1 will be driven by the machine 6 rather than machine 3 but at a lower than normal speed in accordance with the pole ratio of these two machines. Thus, if the pole ratio is 1 : 3, the speed of the hoist for an inspection run will be one third of the normal speed when driven by machine 3. When using the machine 6 for driving the hoist at lower speeds for inspection runs, care must be taken, however, that the operating time does not become too long since the machine 6 when being operated as an asychronous motor will heat up faster than a conventionally constructed asychronous motor due to its relatively large slip characteristic.

What is claimed is:

1. In a combined driving and braking system for a hoist, the combination comprising a polyphase driving motor and the rotor of which is coupled to the hoist for driving the latter at a speed determined by the number of poles on the motor, circuit means including a first switch for selectively connecting the stator of said drive motor to a polyphase power supply source, a polyphase eddy-current braking machine having a stator with at least three times the number of poles as are provided on said drive motor and a solid rotor provided with radial longitudinal slits and copper ring discs soldered onto the opposite ends of said rotor, said rotor of said eddy-current braking machine being coupled to said hoist for braking the latter, circuit means including a second switch for selectively connecting the stator of said eddy-current machine to said polyphase power supply source, said second switch being closed when said first switch is opened thereby to disconnect said polyphase driving motor and brake the hoist dynamically to a first lower speed determined by the number of poles of said eddy-current machine, a direct current power supply source, and circuit means including a third switch for connecting the stator of said eddy-current machine to said direct current power supply source when said second switch is opened thereby to disconnect said eddy-current machine from said polyphase power supply source and dynamically effect a further reduction in speed of the hoist to near stand-still condition.

* * * * *